(12) United States Patent
Kurihara et al.

(10) Patent No.: US 7,083,399 B2
(45) Date of Patent: Aug. 1, 2006

(54) MOTOR-DRIVEN COMPRESSORS

(75) Inventors: Tadashi Kurihara, Isesaki (JP); Kazumi Ohsato, Isesaki (JP); Seiichi Hoshino, Isesaki (JP)

(73) Assignee: Sanden Corporation, Gunma (JP)

( * ) Notice: Subject to any disclaimer, the term of this patent is extended or adjusted under 35 U.S.C. 154(b) by 72 days.

(21) Appl. No.: 10/288,374

(22) Filed: Nov. 6, 2002

(65) Prior Publication Data

US 2003/0086800 A1 May 8, 2003

(30) Foreign Application Priority Data

Nov. 8, 2001 (JP) .................... P2001-343630

(51) Int. Cl.
  *F04B 17/00* (2006.01)
  *F04B 35/04* (2006.01)

(52) U.S. Cl. .................. 417/423.7; 417/366; 310/71

(58) Field of Classification Search .......... 310/71, 310/89; 417/423.7, 366, 371, 410.5
See application file for complete search history.

(56) References Cited

U.S. PATENT DOCUMENTS

| | | | | |
|---|---|---|---|---|
| 945,995 | A | * | 1/1910 | Weeks .......... 439/43 |
| 3,913,346 | A | | 10/1975 | Moody, Jr. et al. |
| 4,252,394 | A | * | 2/1981 | Miller .......... 439/566 |
| 4,689,023 | A | * | 8/1987 | Strong et al. .......... 439/189 |
| 4,903,497 | A | | 2/1990 | Zimmern et al. |
| 4,936,112 | A | | 6/1990 | Miller |
| 5,103,652 | A | | 4/1992 | Mizuno et al. |
| 5,329,788 | A | | 7/1994 | Caillat et al. |
| 5,350,039 | A | | 9/1994 | Voss et al. |
| 5,782,610 | A | | 7/1998 | Ikeda |
| 5,828,147 | A | * | 10/1998 | Best et al. .......... 310/71 |
| 5,857,348 | A | | 1/1999 | Conry |
| 6,086,335 | A | | 7/2000 | Bass et al. |
| 6,112,535 | A | | 9/2000 | Hollenbck |
| 6,202,428 | B1 | | 3/2001 | Katayama et al. |
| 6,321,563 | B1 | | 11/2001 | Ikeda et al. |
| 6,380,648 | B1 | * | 4/2002 | Hsu .......... 310/67 A |
| 6,447,269 | B1 | * | 9/2002 | Rexroth et al. .......... 417/365 |
| 6,538,356 | B1 | * | 3/2003 | Jones .......... 310/254 |
| 6,590,309 | B1 | * | 7/2003 | Luttrell .......... 310/184 |
| 6,599,104 | B1 | * | 7/2003 | Saito et al. .......... 417/366 |
| 6,600,244 | B1 | * | 7/2003 | Okazaki et al. .......... 310/71 |
| 6,626,652 | B1 | * | 9/2003 | Koyama et al. .......... 417/423.1 |
| 2002/0025265 | A1 | | 2/2002 | Ikeda |
| 2002/0039532 | A1 | | 4/2002 | Saito et al. |
| 2002/0073729 | A1 | | 6/2002 | Shibuya |
| 2002/0117992 | A1 | | 8/2002 | Hirono et al. |
| 2003/0020344 | A1 | * | 1/2003 | Futami et al. .......... 310/71 |
| 2003/0218394 | A1 | * | 11/2003 | Hashiba et al. .......... 310/71 |
| 2003/0218396 | A1 | * | 11/2003 | Hsieh .......... 310/89 |

FOREIGN PATENT DOCUMENTS

| | | |
|---|---|---|
| FR | 2794190 | 12/2000 |
| JP | 60245447 | 12/1985 |

OTHER PUBLICATIONS

French Search Report, dated Dec. 15, 2003.

* cited by examiner

*Primary Examiner*—William H. Rodriguez
(74) *Attorney, Agent, or Firm*—Baker Botts L.L.P.

(57) ABSTRACT

A motor-driven compressor includes a housing having a compression portion for compressing refrigerant, a motor for driving the compression portion, and a drive circuit for controlling the motor. A connection member having a plate shape is disposed at one end of the motor. The connection member connects a plurality of coils of the motor to the drive circuit. In such motor-driven compressors, because the rolling and bundling of electrical wires extending from coils to connect the drive circuit are not necessary, the size of the motor-driven compressor may be reduced.

6 Claims, 7 Drawing Sheets

MOTOR-DRIVEN COMPRESSORS

BACKGROUND OF THE INVENTION

1. Field of the Invention

The present invention relates to motor-driven compressors used in vehicle air conditioning systems to compress refrigerant, and more particularly, to motor-driven compressors having a motor driven by a power supply, such as a battery.

2. Description of Related Art

Motor-driven compressors are known in the art. For example, a known motor-driven compressor is described in U.S. Pat. No. 6,321,563 B1, which is incorporated herein by reference. Such known motor-driven compressors are formed with a compressor housing containing a compression portion and a motor for driving the compression portion to compress refrigerant. In such known motor-driven compressors, the compressor housing has a cylindrical shape. The compression portion may be a scroll-type compression portion.

In such known motor-driven compressors, a three-phase current, brushless motor may be used. A plurality of coils are provided around a rotor connected to a rotation shaft of the motor, and these coils are provided within the compressor housing in a circumferential direction. Specifically, as shown in FIG. 15, each coil 1 of the motor is secured by a stator 2, which has a cylindrical shape. The rotor (not shown) may be disposed inside stator 2. The plurality of coils 1 may consist of a plurality of electrical wires 1a. The plurality of electrical wires 1a extending from each coil 1 is rolled and bundled in a circumferential direction around stator 2 at one end of stator 2. Each electrical wire 1a is connected to a motor drive circuit (not shown).

In such known motor-driven compressors, however, each electrical wire 1a is coated by insulating material, e.g., rubber, vinyl, or the like. As a result, a bundle of electrical wire 1a is thickened, and the space occupied by electrical wires 1a is increased. Consequently, the size of such known motor-driven compressor may increase.

SUMMARY OF THE INVENTION

A need has arisen to provide motor-driven compressors in which a plurality of electrical wires extending from each coil of a motor are connected to a motor drive circuit without rolling and bundling the electrical wires in a circumferential direction around a stator at its end.

In an embodiment of this invention, a motor-driven compressor comprises a housing for introducing refrigerant and discharging the refrigerant. The motor-driven compressor further comprises a compression portion, a motor, a drive circuit, and a connection member. The compression portion for compressing the refrigerant is disposed within the housing. The a motor for driving the compression potion also is disposed within the housing. The drive circuit controls the motor. The connection member having a plate-shape, is disposed at one end of the motor for connecting a plurality of coils of the motor to the drive circuit.

Objects, features, and advantages of embodiments of this invention will be apparent to, and understood by, persons of ordinary skill in the art from the following detailed description of the invention and the accompanying drawings.

BRIEF DESCRIPTION OF THE DRAWINGS

The present invention may be more readily understood with reference to the following drawings.

DETAILED DESCRIPTION OF PREFERRED EMBODIMENTS

Figure 1:
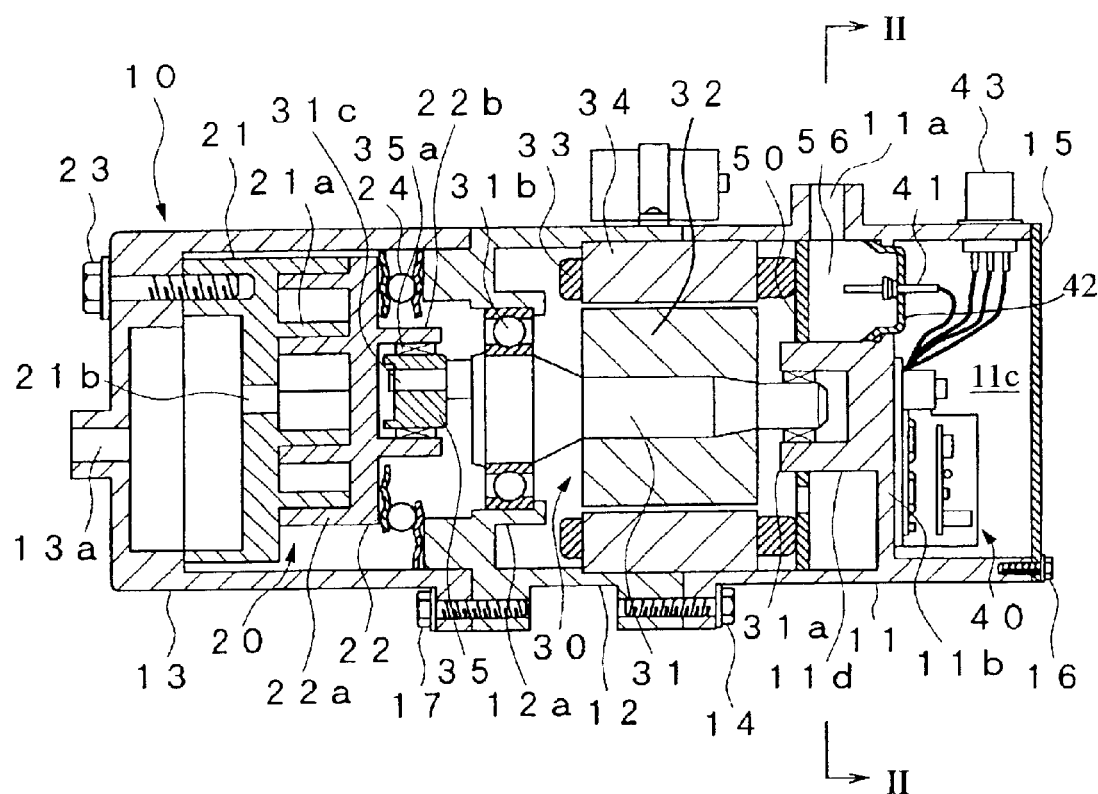
FIG. 1 is a longitudinal, cross-sectional view of a motor-driven compressor according to a first embodiment of the present invention.

Referring to FIGS. 1–7, a motor-driven compressor according to an embodiment of the present invention is described. As shown in FIG. 1, a motor-driven compressor 10 includes a compression portion 20, a motor 30, a drive circuit 40, and a connection plate 50. Compression portion 20 compresses refrigerant introduced into compressor 10. Motor 30 drives compression portion 20 and has a drive shaft 31. Drive circuit 40 drives and controls motor 30. Connection plate 50 connects motor 30 to drive circuit 40.

Motor-driven compressor 10 having a cylindrical shape includes a suction housing 11, an intermediate housing 12, and a discharge housing 13. Housings 11, 12, and 13 may be made from a metal or a metal alloy including aluminum or an aluminum alloy. Intermediate housing 12 and suction housing 11 are connected by a plurality of fasteners, such as bolts 14. Suction housing 11 has a suction port 11a for introducing the refrigerant, which is provided through an outer side wall of suction housing 11. A partition wall 11b partitions an a first area from a second area within suction housing 11. A circuit receiving portion 11c is formed in the first area of suction housing 11. Suction port 11a is in communication with the second area of suction housing 11. An axial end of circuit receiving portion 11c is closed by a lid 15, which is connected to suction housing 11 via a plurality of fasteners, such as bolts 16. A first cylindrical projecting portion 11d is provided on a central surface of partition wall 11b and on a side opposite to circuit receiving portion 11c. First cylindrical projecting portion 11d supports one end of drive shaft 31 via a bearing 31a. Intermediate housing 12 and discharge housing 13 are connected by a plurality of fasteners, such as bolts 17. Second cylindrical projecting portion 12a is provided within intermediate housing 12. Second cylindrical projecting portion 12a supports another end of drive shaft 31 via a bearing 31b. An interior area of discharge housing 13 is in communication with an interior area of suction housing 11 via intermediate housing 12. A discharge port 13a is formed through discharge housing 13 at its axial end surface.

Compression portion 20 comprises a fixed scroll member 21 and an orbiting scroll member 22. Fixed scroll member 21 is disposed in discharge housing 13 adjacent to discharge port 13a and orbiting scroll member 22 is disposed in discharge housing 13 at an opposite side of discharge port 13a. Fixed scroll member 21 is fixed to an inner surface of discharge housing 13 by a plurality of bolts 23. Fixed scroll member 21 includes a spiral element 21a provided on one surface of an end plate. A penetration port 21b is formed through the end plate at about the center of fixed scroll member 21 and places compression portion 20 in communication with discharge port 13a of discharge housing 13. Orbiting scroll member 22 includes a spiral element 22a provided on one surface of an end plate and a cylindrical boss portion 22b projecting from another surface of the end plate towards motor 30. A rotation prevention mechanism 24 comprises a plurality of balls, each of which travels in a pair of opposing rolling ball grooves formed in ring-shaped races and is provided between a surface of the end plate of orbiting scroll member 22 and an axial end surface of intermediate housing 12. Rotation prevention mechanism 24 prevents the rotation of orbiting scroll member 22, but allows an orbital motion of orbiting scroll member 22 at a predetermined orbital radius with respect to a center of fixed scroll member 21. Alternatively, an Oldham coupling may be used as the rotation prevention mechanism.

Figure 3:
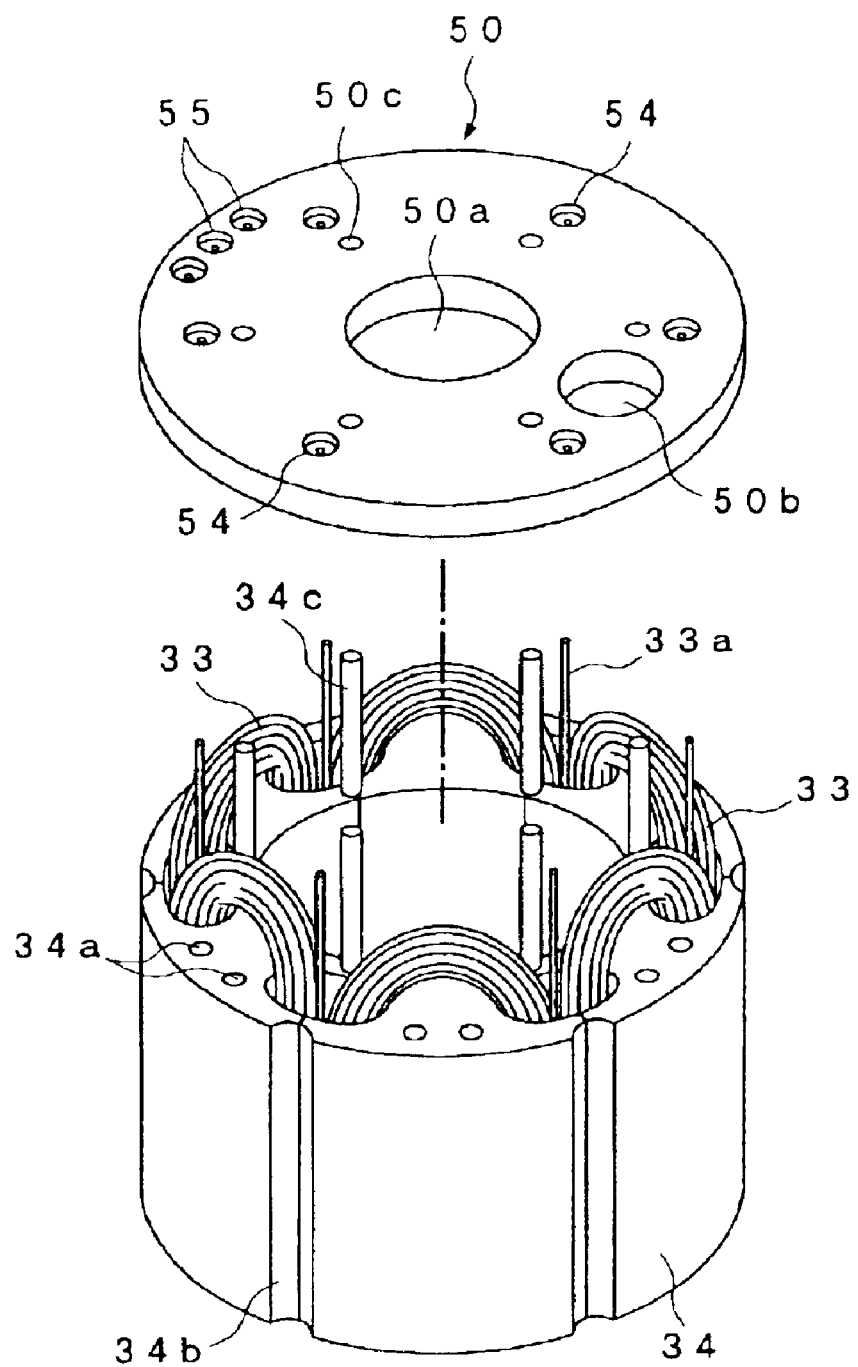
FIG. 3 is a perspective and exploded view of a motor and a connection plate of the motor-driven compressor depicted in FIG. 1.
Figure 4:
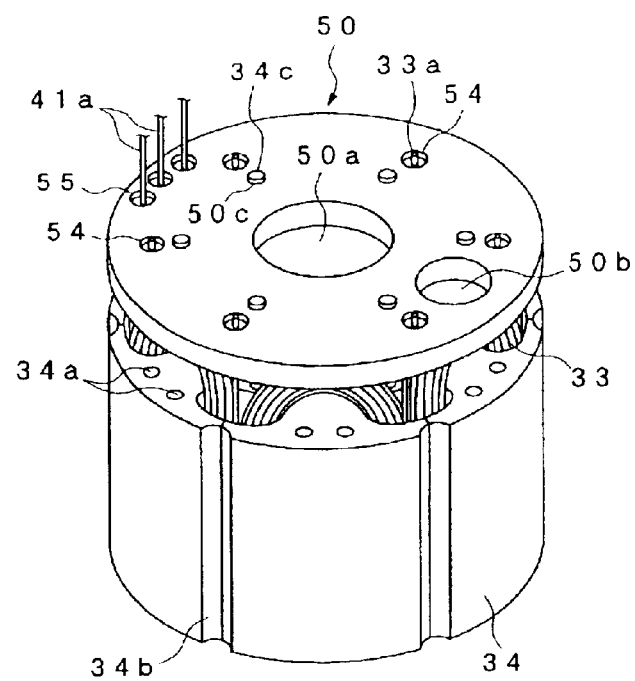
FIG. 4 is a perspective view of the motor and connection plate of the motor-driven compressor depicted in FIG. 1, according to the first embodiment of the present invention.

Motor 30 may be a three-phase current, brushless motor. Motor 30 is disposed within intermediate housing 12 and suction housing 11. Motor 30 comprises drive shaft 31, a rotor 32, a plurality of coils 33, and a stator 34. Drive shaft 31 extends an axial direction of housings 11, 12, and 13. Rotor 32 is a permanent magnet and is attached to drive shaft 31. Rotor 32 is provided inside of stator 34. Each coil 33 is provided around rotor 32. Stator 34, which is a cylindrical shape, secures each coil 33. As shown in FIGS. 3 and 4, each coil 33 is provided in a circumferential direction of stator 34. An electrical wire 33a of each coil 33 extends to an axial direction of stator 34 at an axial end of stator 34. Each electrical wire 33a is connected to a connection plate 50. Stator 34 comprises a number of metal plates, which are stacked alternately. A plurality of apertures 34a are formed at stator 34 in its axial direction for inserting jigs, e.g., bar shaped members, in order to guide the number of metal plates, when the number of metal plates are stacked alternately. A plurality of grooves 34b are formed on a peripheral surface of stator 34 in the axial direction and are circumferentially spaced at regular intervals around stator 34. A plurality of pins 34c for holding connection plate 50 are provided on the axial end of stator 34 at regular intervals about the circumference of the axial end. The plurality of pins 34c are formed integrally with stator 34.

As shown in FIG. 1, one end of drive shaft 31 is rotatably supported by first cylindrical projection portion 11d via bearing 31a and another end of drive shaft 31 is rotatably supported by second cylindrical projecting portion 12a via bearing 31b. An eccentric pin 31c is connected eccentrically to another end of drive shaft 31. Eccentric pin 31c is inserted into cylindrical boss portion 22b of orbiting scroll member 22, and is inserted into a disk-shaped eccentric bushing 35. Eccentric bushing 35 is rotatably disposed in cylindrical boss portion 22b through a bearing 35a.

Drive circuit 40 includes an inverter, variably controlling a rotation speed of motor 30. Drive circuit 40 is in contact with and is fixed to partition wall 11b at a side of circuit receiving portion 11c. Drive circuit 40 is connected to each electrical wire 33 of motor 30 via a plurality of terminals 41, which penetrate through partition wall 11b. Each terminal 41 is attached to a mounting plate 42, which is fixed to an aperture of partition wall 11b. Drive circuit 40 also is connected to an external power source (now shown), such as a battery mounted on the vehicle, via connector 43, which is provided on an upper wall of suction housing 11.

Figure 5:
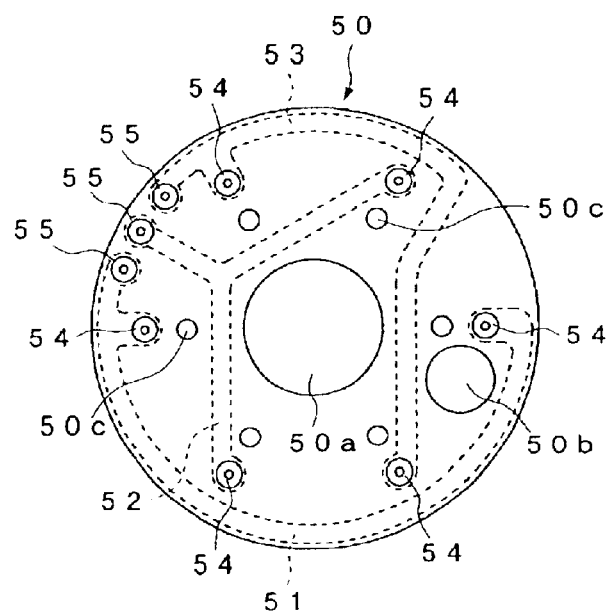
FIG. 5 is a plane view of the connection plate of the motor-driven compressor depicted in FIG. 1.

Connection plate 50 is formed as a circular end plate having a radius substantially the same as that of stator 34, and is provided at the axial end side of stator 34. Connection plate 50 is formed of an insulating material, e.g., a synthetic resin. As shown in FIG. 5, a first, a second, and a third conductive plates 51, 52, and 53 are encased within connecting plate 50 by, for example, an insert molding process. A plurality of motor side connection portions 54, a total of six (6) motor-side connection portions 54, which are connected to each coil 33 of motor 30, are provided at connection plate 50 at regular intervals in a circumferential direction. Each motor-side connection portion 54 corresponds to a position of each coil 33 of motor 30.

In addition, a plurality of drive circuit-side connection portions 55, e.g., a total of three (3) drive circuit-side connection portions 55, are provided at connection plate 50 at predetermined positions adjacent to each other. Each drive circuit-side connecting portion 55 is disposed at a position corresponding to each terminal 41 of motor 30, and connected to each terminal 41 of motor 30 via first, second, and third conductive plates 51, 52, and 53. Specifically, first and third conductive plates 51 and 53 are extended from drive circuit-side connection portions 55 at either end to motor-side connection portions 54 at predetermined positions sequentially linking motor-side connection portions 54. Second conductive plate 52 extends from drive circuit-side connection portion 55 at a center position to motor-side connection portions 54 at predetermined positions, and separates two (2) routes along the way.

Figure 6:
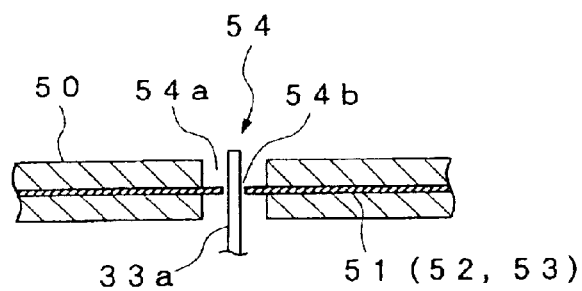
FIG. 6 is a cross-sectional view showing a first embodiment of a drive circuit-side connection portion in the motor-driven compressor depicted in FIG. 1.

As shown in FIG. 6, each motor-side connection portion 54 is formed to expose a part of first conductive plate 51 (second conductive plate 52 or third conductive plate 53) at a larger aperture 54a formed through connection plate 50, and a tip of electrical wire 33a is inserted through a smaller aperture 54b formed through first conductive plate 51 (second conductive plate 52 or third conductive plate 53) of connection plate 50. Likewise, each drive circuit-side connection portion 55 is formed to correspond to motor-side connection portion 54.

Figure 2:
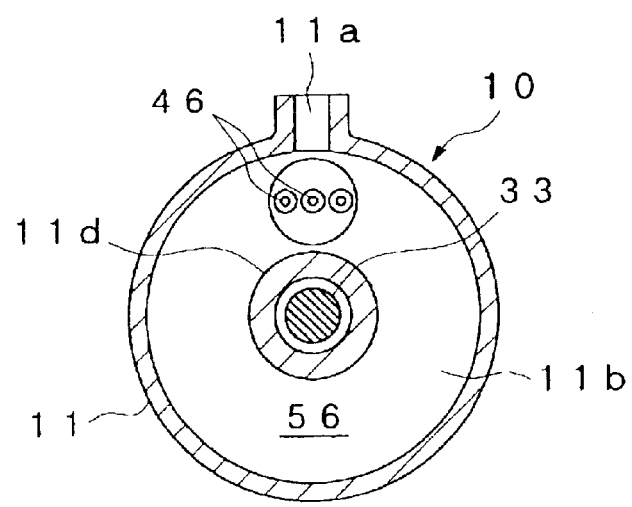
FIG. 2 is a cross-sectional view taken along line II—II of the compressor of FIG. 1.

As shown in FIGS. 3 and 4, a penetrating aperture 50a is formed at a central portion of connection plate 50 and a refrigerant aperture 50b is formed at a predetermined position in a circumferential direction. Specifically, as shown in FIGS. 1 and 2, connection plate 50 is provided at one end of motor 30, and a refrigerant flow route 56 is formed between connection plate 50 and partition wall 11b. As shown in FIGS. 3 to 5, a plurality of apertures 50c are formed through connection plate 50 at regular intervals in the circumferential direction of connection plate 50. Each pin 34c is inserted into one of apertures 50c.

Connection plate 50 is connected electrically to each coil 33 by connecting each electrical wire 33a of motor 30 to each motor-side connection portion 54. Specifically, as shown in FIG. 6, each electrical wire 33a of motor 30 is inserted into smaller aperture 54b of motor side connection portion 54 and is connected to motor-side connection portion 54 by soldering or the like. Therefore, each coil 33 having the same electrode is connected to drive circuit-side connecting portion 55 via first, second, and third conductive plates 51, 52, and 53.

Figure 7:
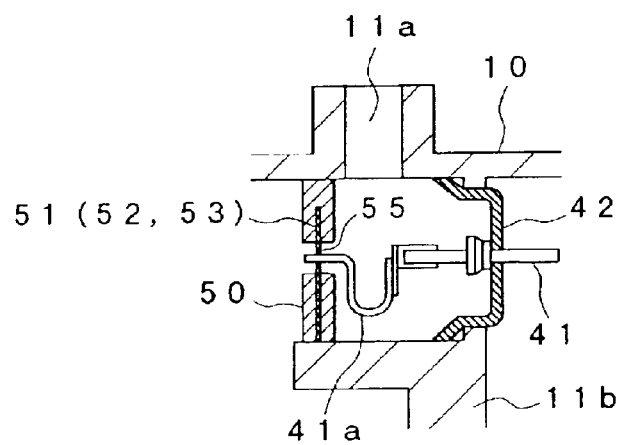
FIG. 7 is a cross-sectional view showing a connection structure between the first embodiment of a drive circuit-side connection portion and a terminal in the motor-driven compressor depicted in FIG. 1.

As shown in FIG. 4, connecting plate 50 is secured to motor 30 by receiving each pin 34c into one of apertures 50c. As shown in FIG. 7, each electrical wire 41a extended from one of terminals 41 is connected to each drive circuit-side connection portion 55. Similarly, each electrical wire 33a is connected to each motor-side connection portion 54.

In operation, when motor 30 is drive, drive shaft 31 is rotated, and orbiting scroll member 22 of compression portion 20 is driven in an orbital motion by the rotation of eccentric brushing 35. Eccentric bushing 35 is connected to drive shaft 31 via eccentric pin 31c. When orbiting scroll member 22 is driven in an orbital motion, fluid pockets, which are defined between spiral element 21a of fixed scroll member 21 and spiral element 22a of orbiting scroll member 22, move from the outer, e.g., peripheral, portions of the spiral elements to the center portion of the spiral elements. Refrigerant gas, which enters suction housing 11 through suction port 11a, flows into one of fluid pockets through a space in motor 30, e.g., a space between stator 34 and rotor 32. When the fluid pockets move from the outer portions of the spiral elements to the center portion of the spiral elements, the volume of the fluid pockets is reduced, and the refrigerant gas in the fluid pockets is compressed. Compressed refrigerant gas confined within the fluid pockets moves through penetration port 21b and is discharged through discharge port 13a of discharge housing 13.

The refrigerant gas flowing into suction housing 11 circulates through refrigerant flow route 56 formed between partition wall 11b and connection plate 50. Subsequently, the refrigerant gas flows towards motor 30 through refrigerant aperture 50b of connection plate 50. When the refrigerant gas is circulated, because drive circuit 40 is in contact with and is fixed to partition wall 11b on an opposite surface of refrigerant flow route 56, heat generated by the inverter of drive circuit 40 is absorbed in low-temperature refrigerant gas through partition wall 11b. Therefore, drive circuit 40 may be sufficiently cooled.

As described above, in motor-driven compressor 10, connection plate 50, which connects each coil 33 of motor 30 electrically to drive circuit 40, is provided at one end of motor 30. Therefore, the rolling and bundling of electrical wires 33a extending from coils 33 to connect electrical wires 33a to drive circuit 40 are not necessary, and a portion of the space occupied by electrical wires 33a at one end of motor 30 may be eliminated. As a result, the size of motor-driven compressor 10 may be reduced compared to that of known motor-driven compressors.

In addition, in motor-driven compressor 10, each electrical wire 33a extending from each coil 33 is inserted into and connected to one of motor-side connection portions 54, the position of which corresponds to the position of each coil 33. Thus, the length of each electrical wire 33a may be minimized. Moreover, each electrical wire 33a is inserted into one of smaller apertures 54b and connected to one of motor side connection portions 54. As a result, an operational connection of each electrical wire 33a to one of motor-side connection portions 54 may be effectively facilitated. Likewise, each electrical wire 41a extending from terminal 41 is inserted and connected to one of drive circuit-side connection portions 55, the position of which corresponds to the position of each terminal 41. As a result, an operational connection of each electrical wire 41a to one of drive circuit-side connection portions 55 may be effectively facilitated.

In addition, in motor-driven compressor 10, each motor-side connection portion 54 is connected to each drive circuit-side connection portion 55 via first, second, and third conductive plates 51, 52, and 53, which are encased within connection plate 50. As a result, the thickness of connection plate 50 may be reduced, and a portion of the space occupied by connection plate 50 in motor-driven compressor 10 may be effectively eliminated. Moreover, connection plate 50 is secured to motor 30 by inserting each pin 34c of motor 30 into each aperture 50c of connection plate 50. As a result, connection plate 50 may be secured to the interior of motor-driven compressor 10. Moreover, refrigerant flow route 56 is formed between connection plate 50 and partition wall 11b. Therefore, it is not necessary to provide another partition plate to form refrigerant flow route 56. As a result, the number of parts in motor-driven compressor 10 may be reduced.

Figure 8:
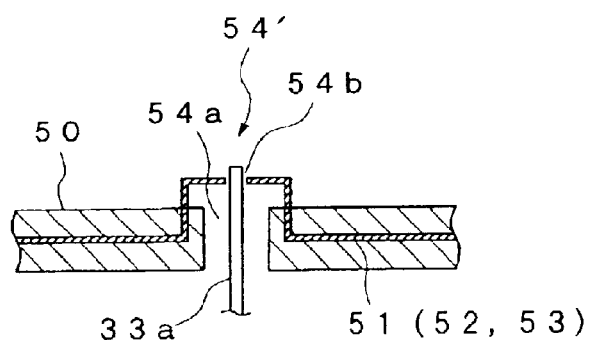
FIG. 8 is a cross-sectional view showing a second embodiment of a motor-side connection portion in the motor-driven compressor depicted in FIG. 1.

In another embodiment of the invention, although each motor-side connection portion 54 is formed to expose the part of first conductive plate 51 (second conductive plate 52 or third conductive plate 53) at a larger aperture 54a formed through connection plate 50. As shown in FIG. 8, each motor-side connection portion 54' may be formed, such that a portion of first conductive plate 51 (second conductive plate 52 or third conductive plate 53) protrudes from the surface of connection plate 50 towards drive circuit 40. In this embodiment of the invention, each electrical wire 33a is connected to motor-side connection portion 54' by soldering or the like. As a result, the operation of connecting each electrical wire 33a to one of motor-side connection portions 54' may be effectively facilitated.

Figure 9:
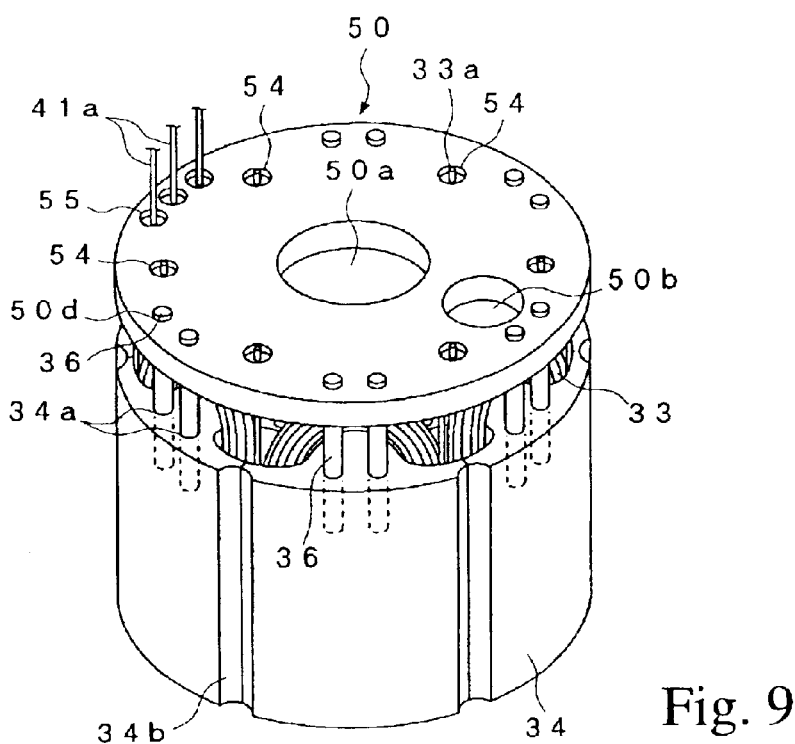
FIG. 9 is a perspective view showing a holding structure of a connection plate of FIG. 4, according to a second embodiment of the present invention.
Figure 10:
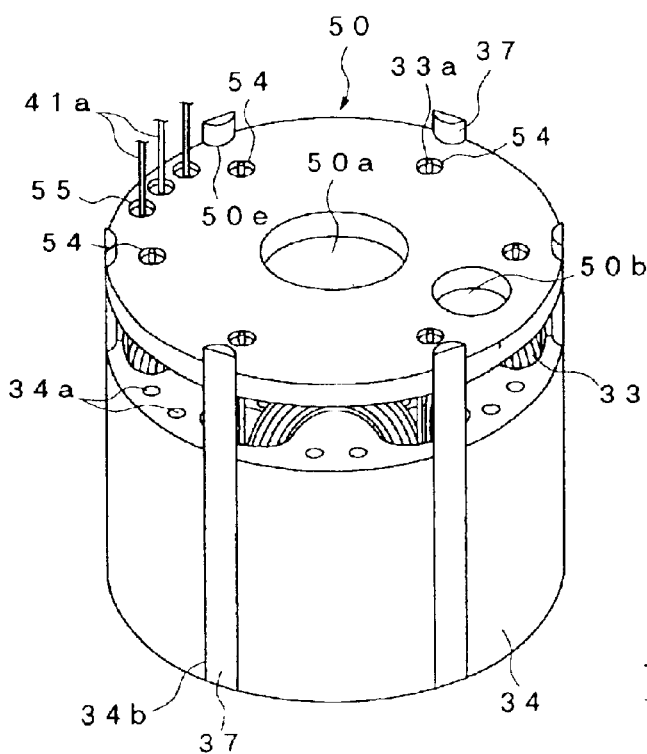
FIG. 10 is a perspective view showing a holding structure of a connection plate of FIG. 4, according to a third embodiment of the present invention.

Referring to FIGS. 9 and 10, other embodiments of holding plate 50 are shown. In the following explanation, the same reference numbers are used to represent the same parts of motor-driven compressor 10, as shown in FIGS. 1–7, and further explanation of those parts is omitted here. As shown in FIG. 9, a plurality of pins 36 are used to secure connection plate 50 to stator 34. One end portion of each pin 36 is inserted into one of apertures 34a formed at one end of stator 34. Because each aperture 34a is formed to receive pins 36, by using these apertures 34a, securing connecting plate 50 to stator 34 may be facilitated.

As shown in FIG. 10, a plurality of engaging members 37 are used to secure connection plate 50 to stator 34. One end portion of each engaging member 37 is engaged with and is fixed to one of grooves 34b formed in the peripheral surface of stator 34. A plurality of grooves 50e are formed in a circumferential surface of connection plate 50 at regular intervals. Another end portion of each engaging member 37 is engaged with and is fixed to one of grooves 50e. Because each groove 34b of stator 34 is formed in advance, by using these grooves 34b, securing connection plate 50 to stator 34 may be facilitated.

Figure 11:
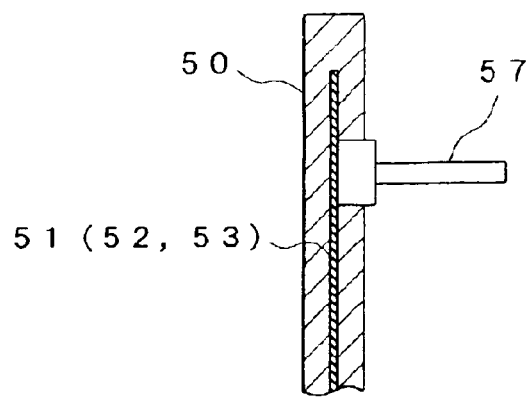
FIG. 11 is a cross-sectional view showing a second embodiment of a drive circuit-side connection portion in the motor-driven compressor depicted in FIG. 1.
Figure 12:
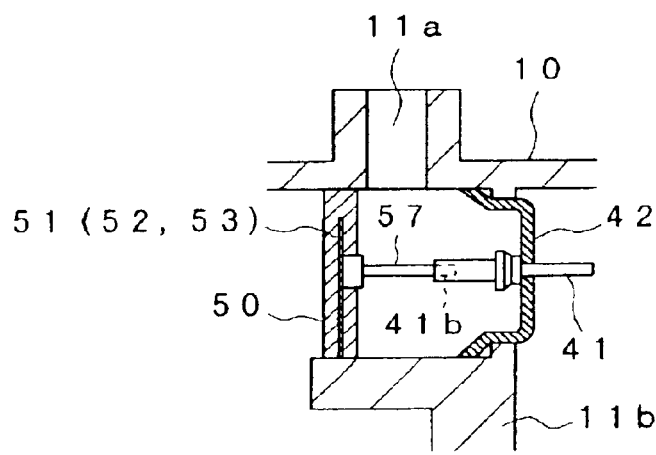
FIG. 12 is a cross-sectional view showing a connection structure between the second embodiment of a drive circuit-side connection portion and a terminal.

Referring to FIGS. 11–14, other embodiments of the connection structure between connection plate 50 and drive circuit 40 are shown. In the following explanation, the same reference numbers are used to represent the same parts of motor-driven compressor 10, as shown in FIGS. 1–7, and further explanation of those parts is omitted here. As shown in FIG. 11, a drive circuit-side connection portion 57 having a pin-shape is formed of an electrically conductive material. Each drive circuit-side connection portion 57 is connected to first conductive plate 51 (second conductive plate 52 or third conductive plate 53), and one end of drive circuit-side connection portion 57 is encased within connection plate 50. As shown in FIG. 12, a connection aperture 41b for connecting drive circuit-side connection portion 57 to terminal 41 is formed at terminal 41. By inserting another end of drive circuit-side connection portion 57 into connection aperture 41b, drive circuit-side connection portion 57 is electrically connected to terminal 41. Therefore, using, e.g., soldering, another electrical wire to connect between drive circuit-side connection portion 57 and terminal 41 is not necessary. As a result, securing connection plate 50 to drive circuit 40 via terminal 41 may be effectively facilitated.

Figure 13:
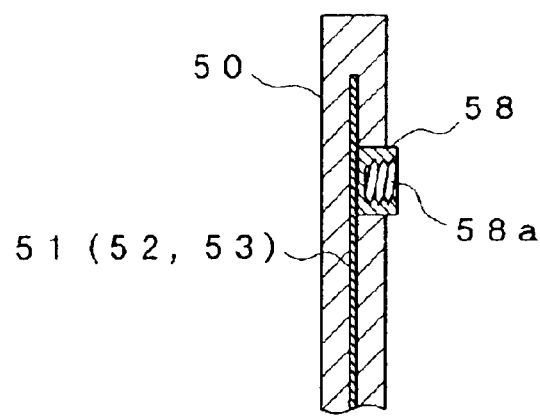
FIG. 13 is a cross-sectional view showing a third embodiment of a drive circuit side connection portion in the motor-driven compressor depicted in FIG. 1.
Figure 14:
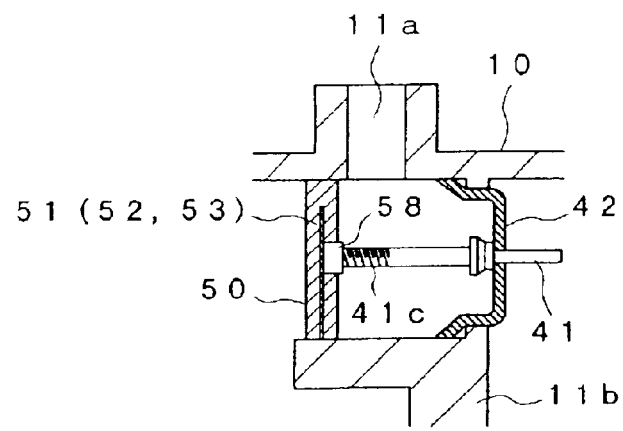
FIG. 14 is a cross-sectional view showing a connection structure between the third embodiment of a drive circuit side connection portion and a terminal.
Figure 15:
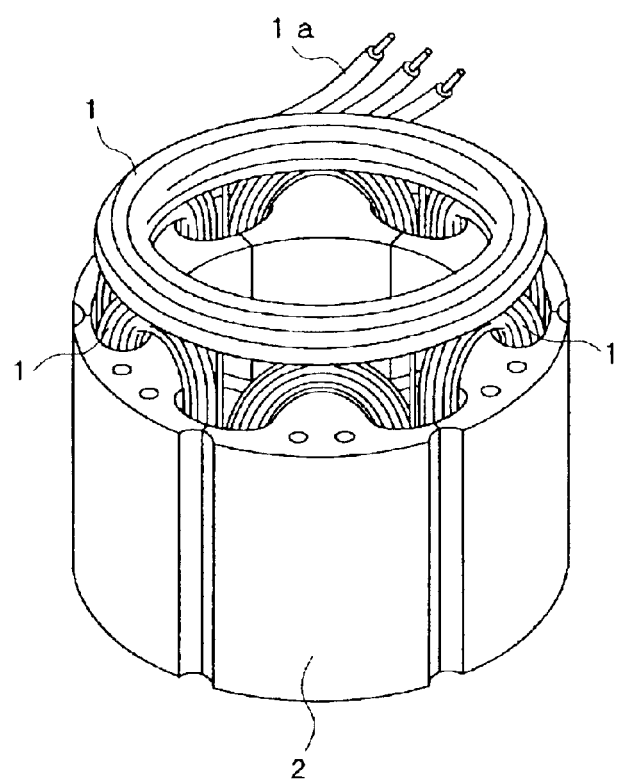
FIG. 15 is a perspective view of a motor of a known motor-driven compressor.

As shown in FIG. 13, a drive circuit connection portion 58 having an internal threaded portion 58a is formed of electrically conductive materials. Each drive circuit connecting portion 58 is connecting plate 50, so that each drive circuit connection portion 58 is contact with first conductive plate 51 (second conductive plate 52 or third conductive plate 53). Moreover, as shown in FIG. 14, an external thread portion 41c is formed at one end of terminal 41. By screwing each external threaded portion 41c to one of internal threaded portion 58a, each drive circuit connection portion 58 is electrically connected to one of terminals 41. Therefore, using, e.g., soldering, another electrical wire to connect between drive circuit-side connection portion 58 and terminal 41 is not necessary. As a result, securing connection plate 50 to drive circuit 40 via terminal 41 may be effectively facilitated.

As described above, in a motor-driven compressor according to the various embodiments of the present invention, because the rolling and bundling of electrical wires extending from coils to connect electrical wires to a drive circuit are not necessary, the size of the motor-driven compressor may be reduced compared to known motor-driven compressors by eliminating space accommodating the electrical wires. Moreover, because using, e.g., soldering, another electrical wire to connect between each drive circuit-side connection portion and one of terminal is not necessary, securing a connection plate to a drive circuit via each terminal may be effectively facilitated.

Although the present invention has been described in connection with preferred embodiments, the invention is not limited thereto. It will be understood by those skilled in the art that other embodiments, variations, and modifications of the invention will be apparent to those skilled in the art from a consideration of this specification or practice of the invention disclosed herein, and may be made within the scope and spirit of this invention, as defined by the following claims.

What is claimed is:

1. A motor-driven compressor comprising:
   a housing for introducing refrigerant and discharging the refrigerant;
   a compression portion for compressing the refrigerant, wherein said compression portion is disposed within said housing;
   a motor for driving said compression potion, wherein said motor is disposed within said housing;
   a drive circuit for controlling said motor; and
   a connection member having a plate-shape, disposed at one end of said motor for connecting a plurality of coils of said motor to said drive circuit, wherein said connection member includes an insulating material, and a conductive member is encased within said insulating material of said connection member, and wherein said connection member further comprises a refrigerant aperture formed through said connection member to form a flow route of the refrigerant.

2. The motor-driven compressor of claim 1, wherein said connection member has a plurality of motor-side connection portions to connect said plurality of coils of said motor, and each said motor-side connection portion is disposed at a position corresponding to each said coil of said motor.

3. The motor-driven compressor of claim 2, wherein said plurality of motor-side connection portions is formed at said conductive member of said connection member.

4. The motor-driven compressor of claim 1, wherein said connection member has a plurality of drive circuit-side connection portions to connect a plurality of terminals of said drive circuit, and each said drive circuit side connection portion is disposed at a position corresponding to one of said terminals of said drive circuit.

5. The motor-driven compressor of claim 4, wherein said plurality of drive circuit-side connection portions is formed at said conductive member of said connection member.

6. The motor-driven compressor of claim 1, wherein said connection member is fitted with a plurality of engaging members, which secure said connection member to one end of said motor.

* * * * *